United States Patent [19]

Machino et al.

[11] Patent Number: 4,719,620
[45] Date of Patent: Jan. 12, 1988

[54] SIGNAL TRANSMISSION SYSTEM IN A BUS-TYPE NETWORK

[75] Inventors: Katsuyuki Machino, Abiko; Masahiro Ise, Kashiwa; Tsuneyuki Iwano, Tokyo, all of Japan

[73] Assignee: Sharp Kabushiki Kaisha, Osaka, Japan

[21] Appl. No.: 816,337

[22] Filed: Jan. 6, 1986

[30] Foreign Application Priority Data

Jan. 11, 1985 [JP] Japan .................................... 60-3679

[51] Int. Cl.⁴ .......................... H04J 3/02; H04Q 11/04
[52] U.S. Cl. ......................................... 370/85; 370/60; 340/825.5
[58] Field of Search ................... 370/85, 60, 94, 100, 370/110.1; 340/825.5

[56] References Cited

U.S. PATENT DOCUMENTS

| | | | |
|---|---|---|---|
| 4,481,626 | 11/1984 | Boggs et al. | 370/94 |
| 4,516,239 | 5/1985 | Maxemchuk | 370/94 |
| 4,539,677 | 9/1985 | Lo | 370/94 |
| 4,584,679 | 4/1986 | Livingston et al. | 370/94 |
| 4,594,705 | 6/1986 | Yahata et al. | 370/85 |

Primary Examiner—Robert L. Griffin
Assistant Examiner—Curtis Kuntz
Attorney, Agent, or Firm—Birch, Stewart, Kolasch & Birch

[57] ABSTRACT

A signal transmission system which constantly allows data with the top priority to pass preceding others in a bus-type network. In transmitting a packet consisting of a plurality of start-synchronized frames, the bus is monitored for a predetermined period after the first frame transmission. If a frame-start signal is detected during this predetermined period, the next frame is promptly transmitted synchronously with the detected frame-start signal. If no frame-start signal is detected during this period, the next frame is transmitted immediately after the predetermined period elapses. As a result, each frame by a transmitting terminal starts at the same time as that by another terminal. Therefore, so long as the clock pulse error between the different terminals is small enough to permit a frame transmission, the terminals can detect collision for each frame. As soon as either of the terminals detects collision, it stops data transmission, whereby a packet with the top priority is always permitted to pass.

4 Claims, 6 Drawing Figures

SIGNAL TRANSMISSION SYSTEM IN A BUS-TYPE NETWORK

BACKGROUND OF THE INVENTION

1. Field of the Invention

The present invention relates to a signal transmission system in a bus-type network.

2. Description of the Prior Art

CSMA/CD has been proposed as a system for transmitting data via a bus-type network by use of a scrambling or prioritization circuit. With this system, the bus is monitored at all times so that a signal is transmitted promptly or after a predetermined period when no signal is detected on the bus. There is a possibility that data transmission is started simultaneously with data transmission from another terminal due to signal transmission delay—a phenomenon called collision hereinafter. To avoid this, the system is provided with means for detecting collision by comparing an output signal with a signal on the bus, so that data transmission is stopped when collision is detected. In this case, the bus may be designed to permit either one of the colliding data to pass through the circuit.

An example of this kind of bus is shown in FIG. 1 in which the bus is composed of wired OR circuits of open collectors. A, B and C are transmitting/receiving terminals.

FIG. 2 is a timing chart explaining the above-mentioned collision detection operation by the bus of FIG. 1. In this example, it is asumed that two terminals A and B start transmitting signals simultaneously at the point 0. After transmitting signals, the terminals A and B sample the signal on the bus. If the signal sampled by one of the terminals is different from that transmitted by that terminal, the terminal stops data transmission immediately. Referring to FIG. 2, collision is not detected by any terminals at the sampling points $T_1$ and $T_2$ where the signal on the bus is identical with the one transmitted by the two terminals A and B. At the point $T_3$ where the signal on the bus is LOW though the terminal B outputs HIGH signal, the terminal B detects collision and stops data transmission immediately. The terminal A, which does not detect collision, continues data transmission. Thus, other data on the bus cannot be destroyed, because the terminal stops data transmission immediately after detecting collision.

Using the above system, it is possible to give higher priority to a particular packet. Since LOW signal is given higher priority than HIGH signal in this example, a particular packet is allowed to pass through the circuit prior to other packets if the particular packet has a series of LOW signals for the leading bits.

Collision detecting operation is conducted from the leading bit. If no collision is detected in the first frame, the detecting operation may be continued for the second and subsequent frames.

FIG. 3 shows a case where the two terminals A and B transmit first frames of the same data simultaneously. In this case, it is assumed that the two terminals A and B have different clock pulses. For simplicity, the bus is composed of wired OR circuits as described earlier. The receiving terminal C receives signals by the same clock pulse as the terminal B. After signal transmission, the terminals A and B sample signals on the bus at the center of each bit.

The terminals start data transmission simultaneously at the point $T_0$. The difference in data output timing ($T_{E1} \sim T_{E9}$) by the terminals grows larger with time because of the clock pulse error. However, collision will not be detected unless the data output timings of the terminals deviate with each other by more than a half bit before the final bit of a frame. Naturally, the terminal C having the same clock pulse as the terminal B can receive correct signals. Normally, in start-synchronized transmission, the clock is required to have such a high accuracy as to restrict a bit transmitting-/receiving timing error to within ½ a bit for a frame. Since the example of FIG. 3 satisfies this requirement, the terminal C can receive transmitted data correctly.

FIG. 4 shows signal waveforms transmitted from the terminals A and B and that on the bus for the case where the terminals transmit frames of data sequentially. In this example, the starting bits of the terminals do not synchronize with each other because of difference in the clock pulse. At the point $T_c$ where the signal level is LOW on the bus while signal output from the terminal B is HIGH, the terminal B detects collision and stops data transmission immediately. As a result, the data transmitted from the terminal A survives and continues to be outputted onto the bus. Meanwhile, the terminal C, which receives signals by the start timing signal $T_s$ of the terminal B, is sampling data by the timing shown in FIG. 4. As result, signal output 0101 from the terminal A is possibly read as 0100. Namely, neither of the packets from the terminals A and B pass the circuit because data transmitted from the terminal A is destroyed by that from the terminal B.

OBJECT AND SUMMARY OF THE INVENTION

Object of the Invention

It is the object of the present invention to provide a signal transmission system which can detect collision in each frame of a packet to allow a packet with higher priority to pass through the circuit preceding the other packets without data destruction, irrespective of any clock pulse difference between terminals.

Other objects and further scope of applicability of the present invention will become apparent from the detailed description given hereinafter. It should be understood, however, that the detailed description and specific examples, while indicating preferred embodiments of the invention, are given by way of illustration only. Various changes and modifications within the spirit and scope of the invention will become apparent to those skilled in the art from this detailed description.

Summary of the Invention

According to the signal transmission system of the present invention, a packet of a plurality of frames is transmitted with start signal synchronization. For transmitting the second and subsequent frames by this system, the bus is monitored for a predetermined period. When a frame-start signal is detected during this predetermined period, a frame is transmitted immediately in synchronization with the start signal. If a frame-start signal is not detected during the predetermined period, a frame is transmitted immediately after the predetermined period elapses. Consequently, the start timings for each frame by different transmitting terminals coincide with each other. As long as the clock pulse difference between the two terminals is small enough to permit transmission of a frame of data, it is possible to detect collision in each frame. Since data transmission is terminated upon detection of collision, a packet with the higher priority is always permitted to pass through the circuit.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 4:
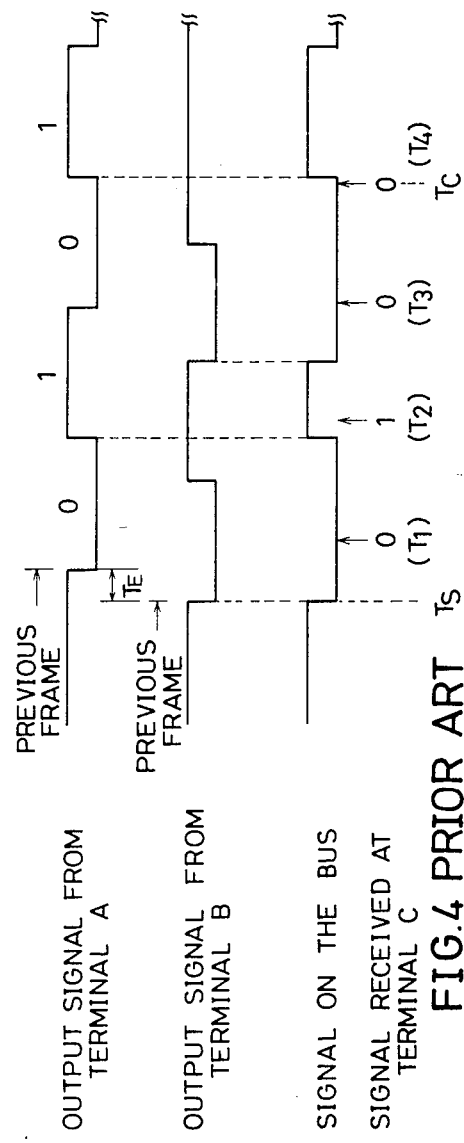
Figure 5:
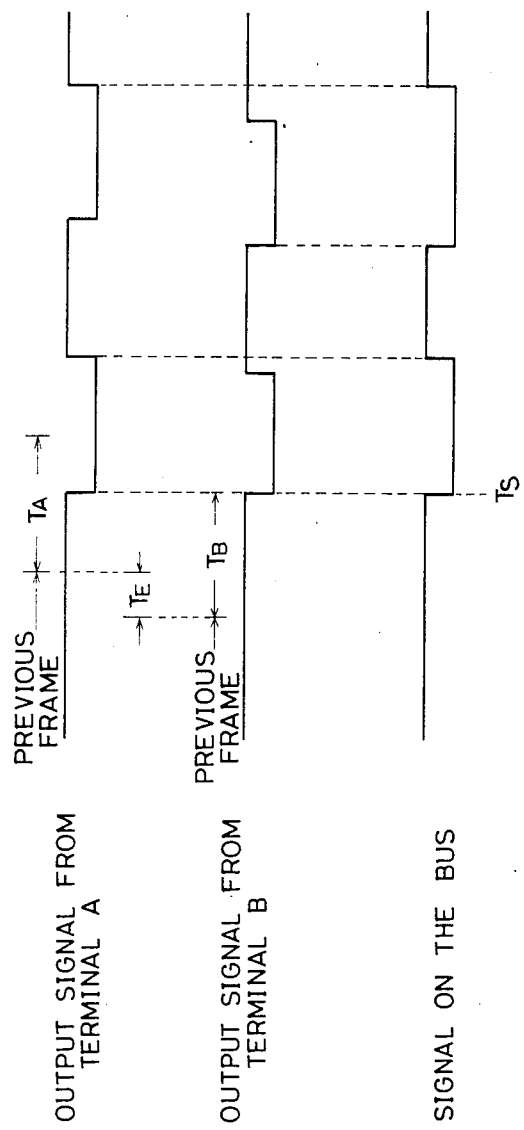
FIG. 5 is a timing chart for explaining an operational mode of an embodiment of a signal transmission system of the present invention.

FIG. 5 is a timing chart that explains an operational mode of the signal transmission system of the present invention. In this example, it is assumed that neither of the terminals A and B have detected collision in the preceding frames. Due to the clock pulse error, the data transmission timings of the terminals A and B have already deviated from each other by $T_E$ by the end of the preceding frame. If frames were sequentially outputted from both terminals without eliminating the deviation, the data on the bus might be destroyed as described with reference to FIG. 4. To avoid the data destruction, the frame-start timing of one terminal must be synchronized with that of the other.

Figure 1:
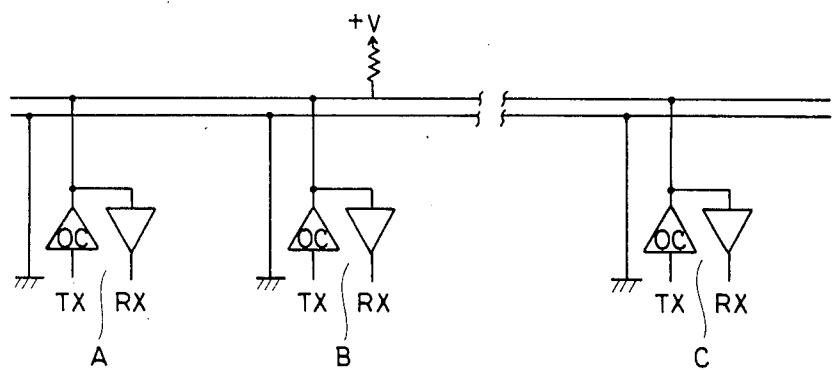
FIG. 1 is a schematic chart showing a general structure of the bus-type network.
Figure 2:
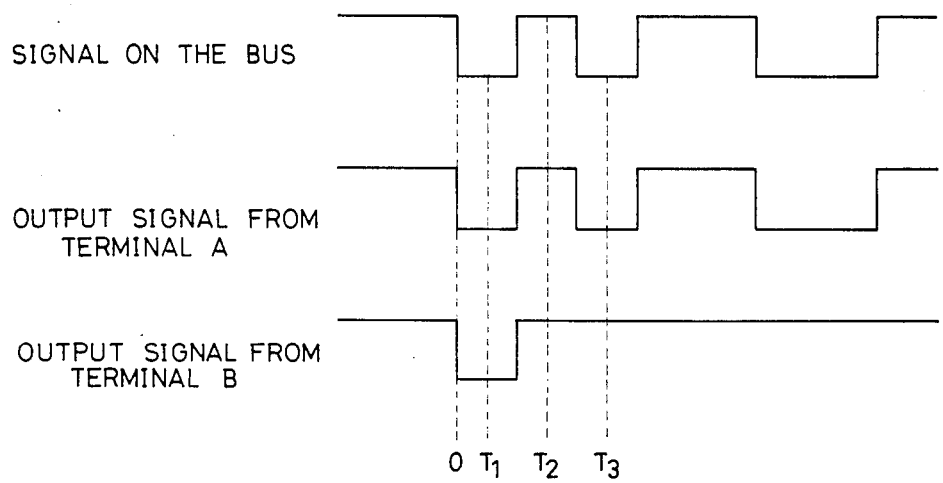
FIG. 2 is a timing chart for explaining a collision detection operation generally conducted in the bus-type network of FIG. 1.
Figure 3:
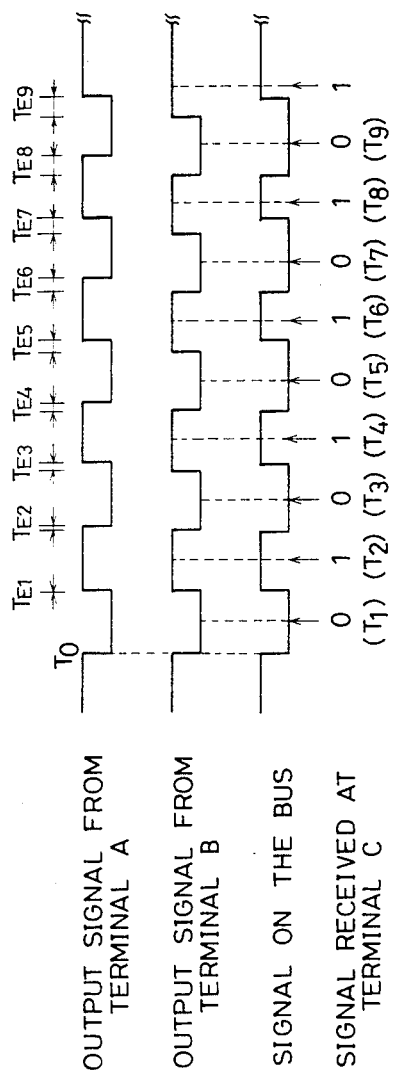
FIGS. 3 and 4 are timing charts for explaining operational modes of the conventional bus-type network.

In the embodiment shown in FIG. 5, the clock of the terminal A is slower than that of the terminal B. After outputting the preceding frames, the terminals A and B monitor the bus for the respective predetermined periods ($T_A$ for the terminal A and $T_B$ for the terminal B). If a terminal does not detect a frame-start signal on the bus, it outputs the next frame immediately after the predetermined period elapses, as the terminal B does in FIG. 5. On the contrary, if a terminal detects a frame-start signal during the predetermined period, the terminal starts frame transmission immediately in synchronization with the detected start signal, as the terminal A does in FIG. 5. The terminal A starts transmitting the next frame before the predetermined period $T_A$ elapses. Consequently, the frames by the terminals A and B start simultaneously, so that collision, if any, can be detected within the frames, enabling the data on the bus to be received correctly as described with reference to FIG. 3. Thus, the terminals A and B output subsequent frames with the starting bits being aligned with each other. Therefore, as long as the clock pulse error within a frame is small enough to permit collision detection, collision can be detected for each frame however many frames are contained in the packet. Since the terminal that detects collision stops data transmission, the data transmitted from the other terminal will never be destroyed. In the above embodiment, the predetermined period $T_B$ is set larger than the deviation $T_E$.

Figure 6:
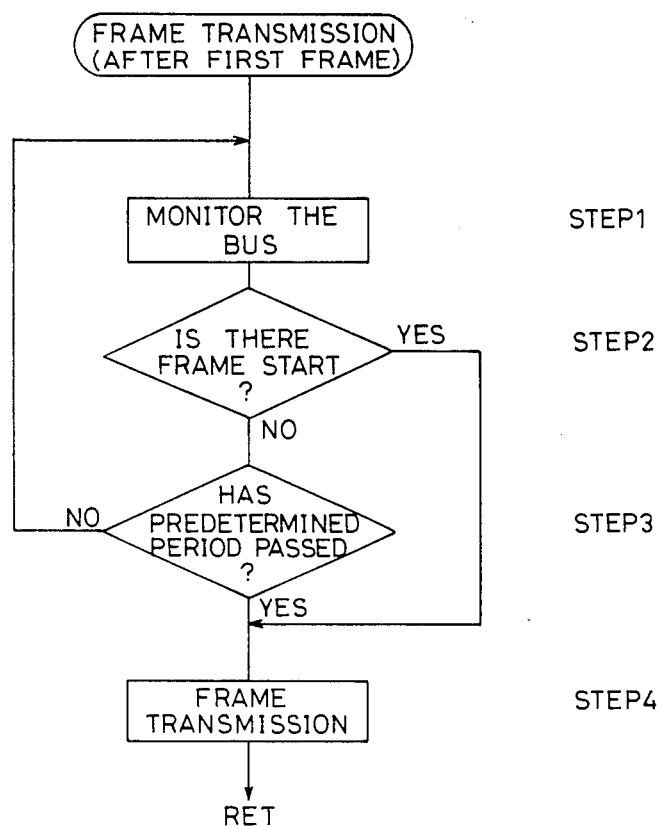
FIG. 6 is a flow chart showing a signal transmitting routine conducted by the signal transmission system of the present invention.

FIG. 6 is a flow chart showing a signal transmission routine for the second and subsequent frames. Immediately after outputting the first frames, the terminals start monitoring the bus (STEP 1). If a terminal detects a framestart signal on the bus within the predetermined period, it transmits the second frame promptly (The routine skips from STEP 2 to STEP 4). The terminals continue monitoring the bus for the predetermined period while the routine is repeated from STEP 1 through STEP 2 to STEP 3. If a terminal does not detect a frame-start signal within the predetermined period, it transmits the next frame when the predetermined period has elapsed (the routine proceeds from STEP 3 period to STEP 4).

The invention being thus described, it will be obvious that the same may be varied in many ways. Such variations are not to be regarded as a departure from the spirit and scope of the invention, and all such modifications are intended to be included within the scope of the following claims.

What is claimed is:

1. A signal transmission system in a bus-type network for transmitting or receiving a data packet of a plurality of start-synchronized data frames whereby a packet with top priority is constantly allowed to pass through a circuit prior to other packets when a plurality of said packets collide with one another, the signal transmission system comprising:

a bus;

a plurality of transmitting/receiving terminals for respectively transmitting a packet of a plurality of frames and for monitoring the bus for a predetermined period after outputting a preceding frame;

each said transmitting terminal monitoring said bus for said predetermined time after the preceding frame and transmitting a subsequent frame having a frame start signal at the end of said predetermined time, each said transmitting terminal further outputting the next one of said plurality of frames in synchronization with a frame start signal generated by another said transmitting terminal if said frame start signal is detected during said predetermined period;

each said transmitting/receiving terminal including predetermined period generating means for counting said predetermined period for each of said plurality of frames.

2. The signal transmission system of claim 1, wherein said predetermined period is set to be longer than the difference between a frame duration by a transmitting terminal with the fastest clock pulse and the transmitting terminal with the slowest clock pulse.

3. A method of preventing data errors caused by data collisions on a bus in a network having a plurality of transmitting/receiving terminals for transmitting or receiving a data packet of a plurality of start-synchronized data frames where a data packet having a top priority is transmitted prior to other packets when a collision is detected, said method being performed by each said terminal and comprising:

(a) monitoring the bus to detect the presence of a first frame;

(b) monitoring the bus for a predetermined period after said first frame is completed to detect whether a frame start signal of a subsequent frame has been generated by another said terminal;

(c) transmitting a subsequent frame having a frame start signal at the end of said predetermined period if no frame starg signal is detected by said step (b) of monitoring during said predetermined period;

(d) transmitting a subsequent frame having a frame start signal immediately upon detection of a frame start signal during said predetermined period by said step (b) of monitoring.

4. The method of claim 3 wherein each said terminal performs said method which further comprises;
said steps (b-d) are repeated with said subsequent frames as said first frame until data transmission of said packet by said terminal is completed.

* * * * *